United States Patent
Iwasaki (10) Patent No.: US 8,314,877 B2
(45) Date of Patent: Nov. 20, 2012

(54) LENS BARREL, IMAGING DEVICE AND INFORMATION TERMINAL DEVICE

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 12/532,977

(22) PCT Filed: Mar. 27, 2008

(86) PCT No.: PCT/JP2008/056648
§ 371 (c)(1),
(2), (4) Date: Sep. 24, 2009

(87) PCT Pub. No.: WO2008/117895
PCT Pub. Date: Oct. 2, 2008

(65) Prior Publication Data
US 2010/0103307 A1    Apr. 29, 2010

(30) Foreign Application Priority Data

Mar. 27, 2007    (JP) .................. 2007-082420

(51) Int. Cl.
*H04N 5/225*    (2006.01)
*G02B 13/10*    (2006.01)
*G02B 13/16*    (2006.01)
*G02B 7/04*    (2006.01)
*G03B 3/00*    (2006.01)
*G03B 13/00*    (2006.01)

(52) U.S. Cl. .................. 348/335; 359/699; 396/144
(58) Field of Classification Search .................. None
See application file for complete search history.

(56) References Cited

U.S. PATENT DOCUMENTS

| 4,690,505 A | 9/1987 | Iizuka et al. |
| 6,751,031 B2 * | 6/2004 | Yasutomi .................. 359/819 |
| 6,853,499 B2 | 2/2005 | Iwasaki |
| 2002/0141078 A1 | 10/2002 | Koiwai et al. |
| 2005/0073602 A1 * | 4/2005 | Kamoda et al. .............. 348/335 |
| 2005/0280908 A1 | 12/2005 | Tanaka |
| 2009/0046156 A1 | 2/2009 | Iwasaki |
| 2009/0046198 A1 | 2/2009 | Iwasaki |
| 2009/0066829 A1 | 3/2009 | Iwasaki |

FOREIGN PATENT DOCUMENTS

| JP | 61-4915 | 1/1986 |
| JP | 5-020035 U | 3/1993 |
| JP | 08-09695 | 3/1996 |
| JP | 2001-305408 A | 10/2001 |
| JP | 2001305408 | * 10/2001 |
| JP | 2002-296476 A | 10/2002 |
| JP | 2002-357755 | 12/2002 |
| JP | 2003/279823 A | 10/2003 |
| JP | 2005/070417 A | 3/2005 |
| JP | 2006/003837 A | 1/2006 |
| JP | 2006-039152 A | 2/2006 |
| WO | WO-2006/011621 A | 2/2006 |

* cited by examiner

*Primary Examiner* — Albert Cutler
(74) *Attorney, Agent, or Firm* — Dickstein Shapiro LLP (57) ABSTRACT

A lens barrel includes: at least one lens group which constitutes an imaging optical system; a lens frame which retains the at least one lens group; and a retaining frame which retains the lens frame, the at least one lens group being capable of moving from a collapse position to a photographable position, at least one cam member being arranged between the lens frame and the retaining frame, and tilt of the lens frame relative to the retaining frame being changed by moving the at least one cam member.

15 Claims, 9 Drawing Sheets

LENS BARREL, IMAGING DEVICE AND INFORMATION TERMINAL DEVICE

CROSS-REFERENCE TO THE RELATED APPLICATION

The entire contents of Japanese patent application No. 2007-082420, filed on Mar. 27, 2007, of which the convention priority is claimed in this application, are incorporated hereinto by reference in their entirety.

TECHNICAL FIELD

The present invention relates to a lens barrel, an imaging device and an information terminal device using the lens barrel. In particular, this invention relates to a modification of a structure in which it is possible to mutually perform alignments of optical axes of a plurality of lenses with a simple component formation.

BACKGROUND ART

An imaging lens used for an imaging device includes a plurality of lens groups, and is configured such that distances between lens groups in an optical axis direction vary so that functions such as focusing, zooming namely continuous variation of focal length and collapse are performed. In particular, in an imaging lens equipped with a zoom function or a collapse function or both of the functions, a movement distance in an optical axis direction of a lens groups is long, and a structure of a lens barrel is complex.

Recently, a photographing device such as a digital camera, is requested to have a high performance by which a high quality image can be obtained while having the zoom function, and is requested to be compact for improving the convenience when carrying, and these needs are met by the progress of technological developments. For example, use of a collapsible camera has increased due to a collapsible lens barrel, and is effective to meet the need for compactness. As a mechanism to move a lens group to carry out a collapse function or a zoom function, such a mechanism in which a rotation cylinder is retained by a fixed cylinder, and a lens frame moves backward or forward in an optical axis direction when the rotation cylinder is rotated relative to the fixed cylinder through a cam engagement or a helicoid engagement is usually employed. In a typical mechanism, a fixed cylinder is engaged with a rotation cylinder through a cam, and the rotation cylinder is configured to move backward or forward in an optical axis direction of a lens following a cam groove while rotating centered on the optical axis of the lens, and a straight guide cylinder which is configured to be rotatable relative to the rotation cylinder inside the rotation cylinder and move straight integrally with the rotation cylinder in the optical axis direction is provided, and a lens frame which retains the lens is retained inside the straight guide cylinder.

The lens frame has a cam follower, and the cam follower penetrates through a straight groove extended in an optical axis direction of the straight guide cylinder and is engaged with a cam groove provided at an inner face of the rotation cylinder. When the rotation cylinder rotates, the lens is capable of moving to any position within a movement range in the optical axis direction without rotating along a shape of the cam groove. The rotation cylinder and the straight guide cylinder are engaged for example by engaging a rotation key which is provided at the straight guide cylinder and projects radially with a rotation groove provided at the inner face of the rotation cylinder. According to this structure, the straight guide cylinder can move in the optical axis direction integrally with the rotation cylinder while rotating around the optical axis relative to the rotation cylinder.

A lens barrel is requested in which optical axes of lenses are capable of aligning to maintain an excellent imaging performance. However, it becomes difficult to align the optical axes when a number of driving members which drive the lens increases, and a higher accuracy of the optical axes alignment is requested when the lens barrel is made more and more compact. A structure or a method for aligning optical axes of lenses includes the following: a lens or a lens group having a plurality of lenses is moved in a plane perpendicular to an optical axis and each optical axis of the lenses is aligned; and each of the lenses is tilted to align the optical axes of the lenses.

As a method of tilt adjustment of a lens frame, JP 2006-3837 A discloses a method in which a tilt adjusting washer is selectively inserted between the lens frame and its retaining frame to make adjustments. According to this method, there is a drawback in that it is necessary to confirm the tilt of the lens frame while changing the washer, and assembling and the adjustment become troublesome.

JP 2005-70417 A discloses a lens adjusting device in which a lens frame has a sphere shaped outer circumference, a retaining frame which retains the lens frame and has a sphere shaped inner circumference matching the sphere shape outer circumference of the lens frame, and the lens frame is moved along these sphere shapes. According to this invention, it is necessary to match each sphere shape precisely, the processing of components is extremely difficult, and further, since the lens frame is retained by the sphere shaped structure, it is a weak structure to impact as the lens frame shifts when a load such as the impact is applied.

JP 2003-279823 A discloses a tilt adjusting mechanism in which a lens frame is biased and supported in an optical axis direction by a spring in a lens barrel frame, a rotation plate is disposed between the lens barrel frame and the lens frame, a plurality of convex parts with different heights are formed on a surface of the rotation board facing the lens frame, a plurality of concave parts capable of receiving the plurality of convex parts are formed on the lens frame, and tilt of the lens frame is adjusted by selecting the convex part of the rotation frame which fits in the concave part of the lens frame. According to the invention, though component formation and assembling are easy, there is a drawback in that the tilt adjustment of the lens frame only can be performed step-by-step, and a minute adjustment can not be made.

SUMMARY

In light of the above, at least one object is to provide a lens barrel, an imaging device and an information terminal device using the lens barrel. In the lens barrel, tilt of a lens group is capable of adjusting with a higher accuracy, and assembling and the tilt adjustment of the lens group are capable of being performed easily due to uncomplicated shapes of components.

According to one aspect of a preferred embodiment, a lens barrel includes: at least one lens group which constitutes an imaging optical system; a lens frame which retains the at least one lens group; a retaining frame which retains the lens frame; and at least one cam member, the at least one lens group being capable of moving from a collapse position to a photographable position, the at least one cam member being arranged between the lens frame and the retaining frame, and tilt of the lens frame relative to the retaining frame being changed by moving the at least one cam member.

It is possible for the lens barrel to include: a plurality of lens groups; a lens frame which retains at least one of the plurality of lens groups; and a retaining frame which retains the lens frame, at least one cam member being arranged between the lens frame and the retaining frame.

According to another aspect, tilt of a lens group can be adjusted continuously by at least one cam member, therefore, it is possible to adjust the tilt of the lens group with a higher accuracy. In addition, due to only at least one cam member being arranged between a lens frame and a retaining frame, shapes of components are uncomplicated and it is possible to perform assembling and the tilt adjustment of the lens group easily.

According to a preferable embodiment, it is possible to adjust the tilt of the lens group without enlarging a size of the lens barrel since a tilt adjustment mechanism can be built in a very limited space.

According to another preferable embodiment, the lens frame engages with a cam face of the at least one cam member, therefore it is possible to secure a steady lens group position.

According to a further preferable embodiment, it is possible to decrease eccentricity and a movement in an optical axis direction of the lens group due to the tilt adjustment.

According to a further preferable embodiment, the tilt adjustment can be carried out in each direction and a tilt amount of the lens group relative to a movement amount of at least one cam member can be set the same, therefore it is possible to simplify the adjustment.

According to a further preferable embodiment, a fulcrum of the tilt adjustment can be set at a center of the lens group in its thickness direction, therefore it is possible to decrease the eccentricity and the movement in the optical axis direction of the lens group due to the tilt adjustment.

According to a further preferable embodiment, it is possible to prevent a rotation of the lens group by the tilt adjustment and eccentricity of the lens frame.

According to a further preferable embodiment, a reference position of the tilt adjustment of the lens group can be set to a plane part of the at least one cam member, therefore it is possible to set the reference position without any extra adjustment.

According to a further preferable embodiment, a necessary adjustment amount can be estimated from a marking to move the at least one cam member, therefore it is possible to simplify the tilt adjustment work of the lens group.

According to a further preferable embodiment, the tilt adjustment of the lens group can be carried out with each lens group built into the lens barrel, therefore it is possible to perform the adjustment in a state near a final quality.

According to a further preferable embodiment, it is possible to produce a lens barrel in which optical axes of all lens groups have been adjusted to be aligned, and thus to provide a lens barrel with high imaging performance.

According to another aspect, it is possible to provide an imaging device and an information terminal device equipped with the lens barrel, which are of high imaging performance.

BRIEF DESCRIPTION OF THE DRAWINGS

Preferred embodiments will be described further below with reference to the accompanying schematic drawings, in which.

DETAILED DESCRIPTION

Figure 2:
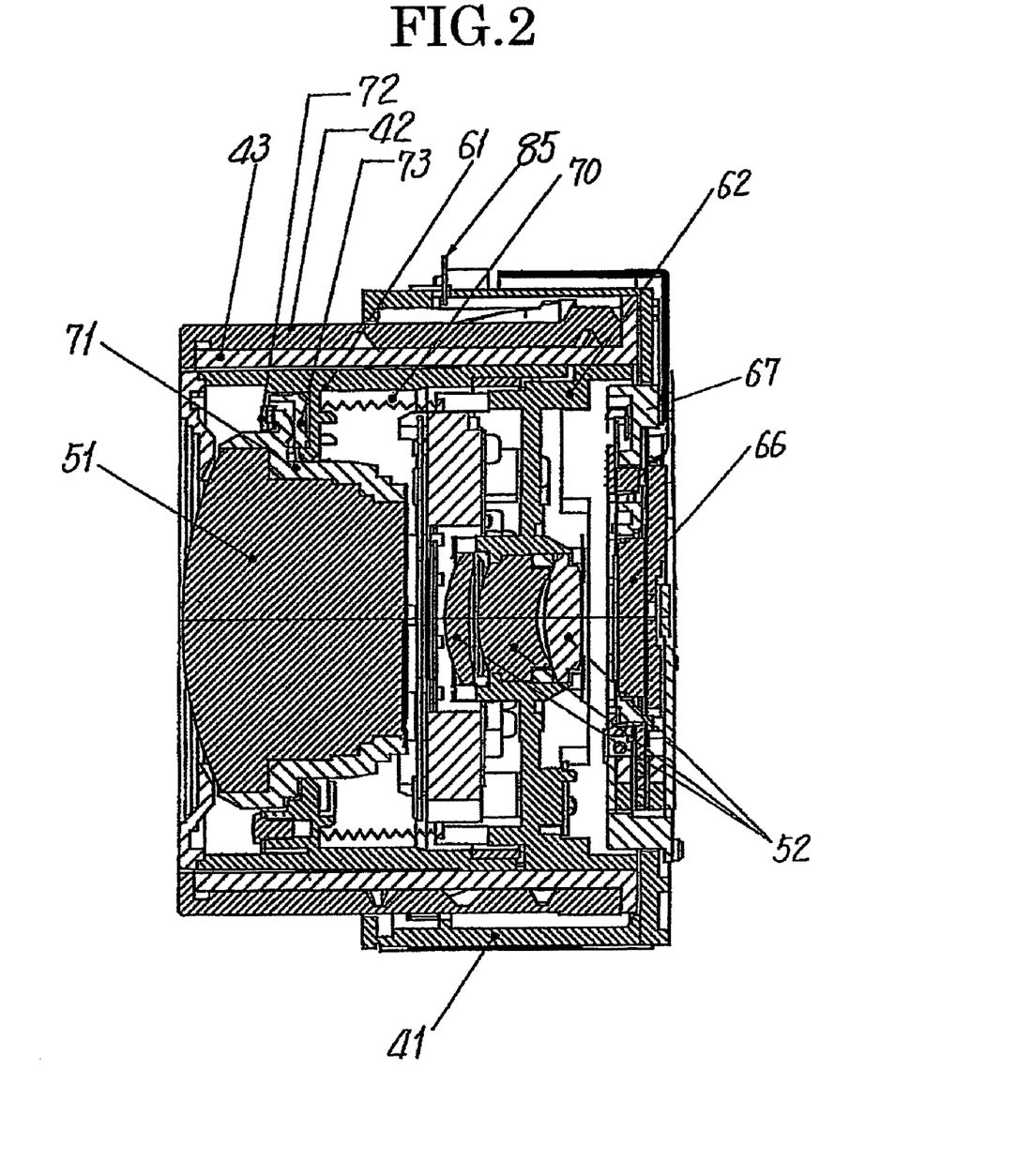
FIG. 2 is a longitudinal sectional view of the lens barrel along line A-A illustrated in FIG. 1 when the lens barrel is at a collapsed state.
Figure 3:
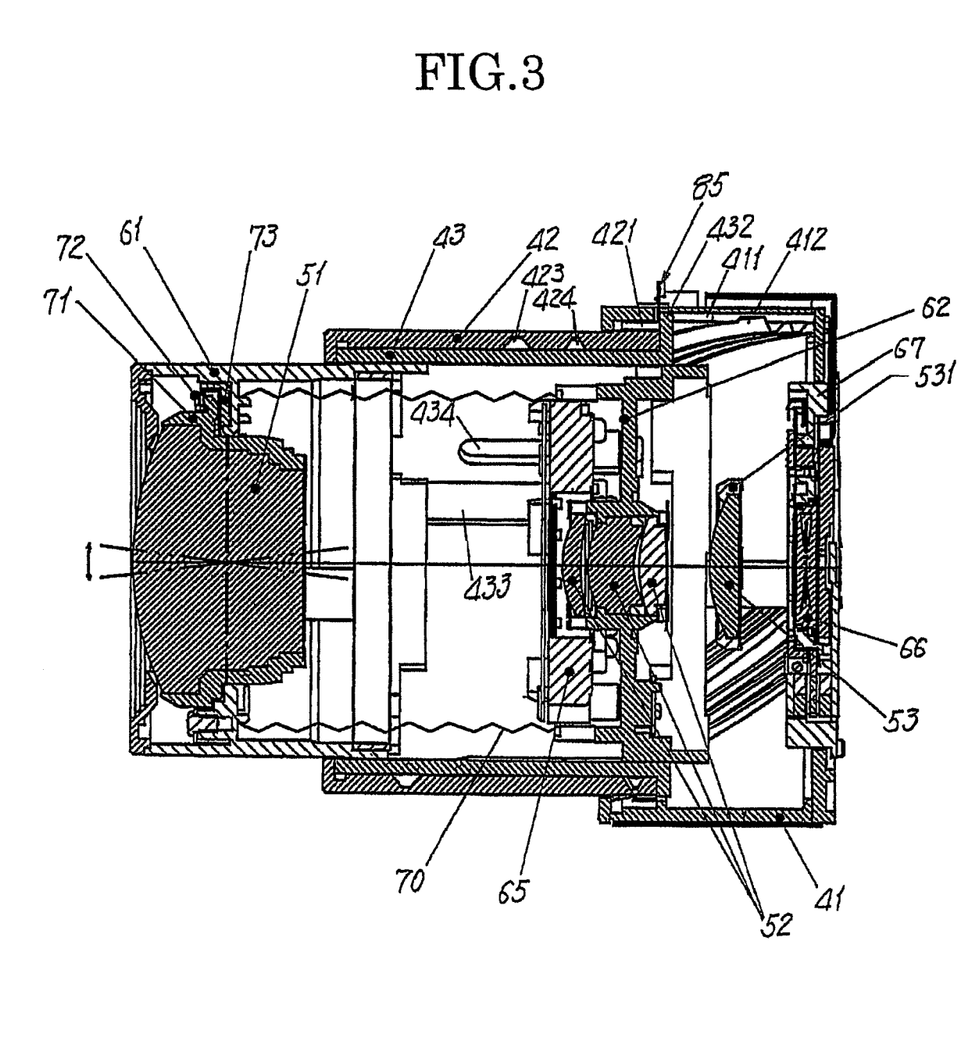
FIG. 3 is a longitudinal sectional view illustrating a movement mode when photographing.

A first embodiment relates to a retractable lens barrel which has a zoom function. In FIG. 2, the left side is a subject side and the right side is an image side. In FIG. 3, the downside is the subject side and the upper side is the image side. In FIG. 2 to FIG. 5, a base end of a fixed cylinder 41 is fixed to a base plate 67 which is fixed to a body or the like of an imaging device such as a camera. The base plate 67 has a hole at its center part, and an imaging device 66 including a CCD or the like is arranged in the hole. The fixed cylinder 41 has at least one straight groove 411 on an inner circumference side, and a female feed screw 412 extending nearly along a length direction of the fixed cylinder 41 over the entirety of the fixed cylinder 41. A rotation cylinder 42 is fitted on the inner circumference side of the fixed cylinder 41, and a cylindrical liner (a straight guide cylinder) 43 is fitted on an inner circumference side of the rotation cylinder 42.

The rotation cylinder 42 has a male screw 421 at an outer circumference of its rear end, and this screw 421 engages with the feed screw 412 of the fixed cylinder 41. Therefore, when the rotation cylinder 42 is rotated around its center axis line (an optical axis), the screw 421 is guided by the feed screw 412 and moves in an optical axis direction. The straight guide cylinder 43 has at least one projection 431 (refer to FIG. 4) projected outward from a radial direction at an outer circumference of its front end (the subject side in FIG. 2 and the lower side in FIG. 3), and by fitting the at least one projection 431 to a circumferential groove formed at an inner circumference of a front end of the rotation cylinder 42, the straight guide cylinder 43 can move in the optical axis direction together with the rotation cylinder 42, and can rotate relative to the rotation cylinder 42. The straight guide cylinder 43 is provided with at least one key 432 projected outward from the radial direction at the outer circumference of its rear end, and the at least one key 432 is fitted to the at least one straight groove 411 of the fixed cylinder 41. Therefore, the straight guide cylinder 43 can go straight along the at least one straight groove 411, but it can not rotate centered on the optical axis. The straight guide cylinder 43 is provided with three straight grooves 433 and three straight grooves 434 along the optical axis direction and penetrated in its thickness direction, and the three straight grooves 433 and the three straight grooves 434 are provided at equal intervals along a circumferential direction respectively. Two cam grooves 423, 424 are formed on the inner circumference side of the rotation cylinder 42 at its front and rear end in the optical axis direction. The cam groove 423 can overlap the at least one straight groove 433 in the radial direction crosswise, and the cam groove 424 can overlap the at least one straight groove 434 in the radial direction crosswise.

Figure 4:
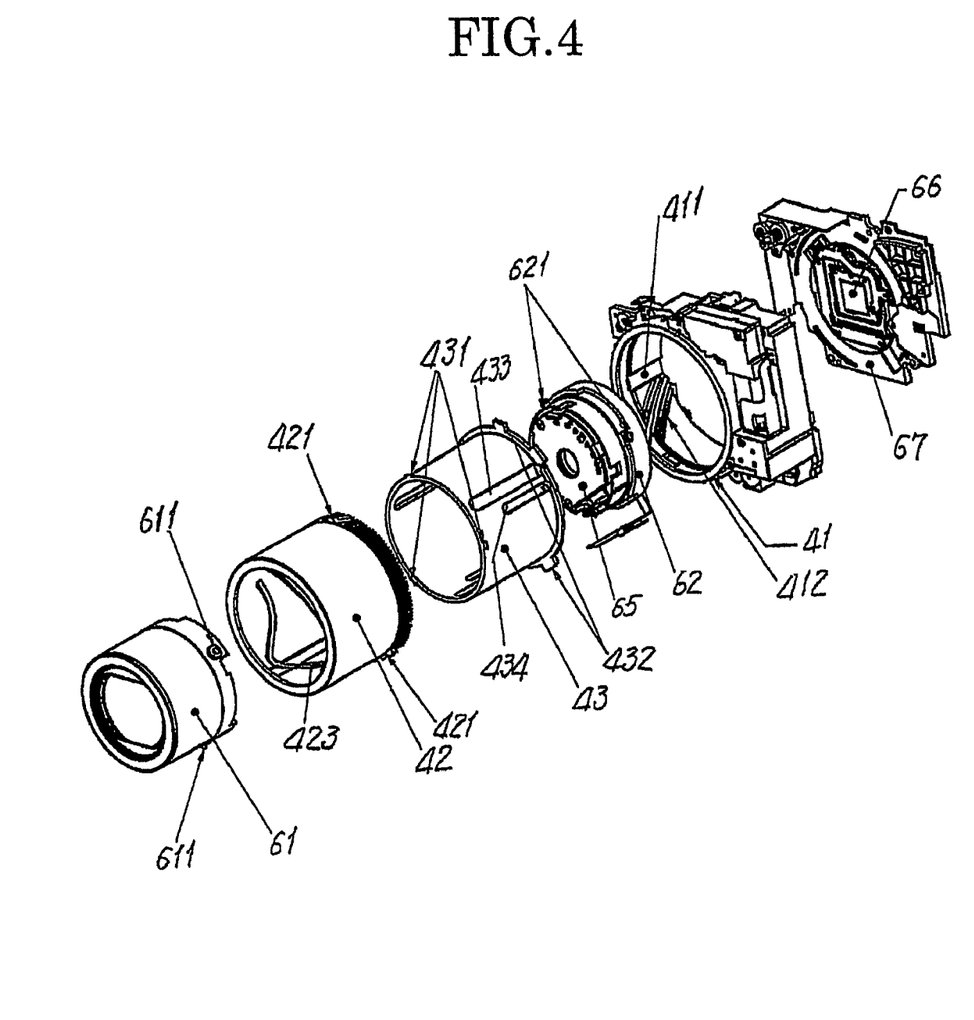
FIG. 4 is an exploded perspective view of the lens barrel.

As illustrated in FIGS. 2 and 3, a retaining frame 61 of a first lens group 51 and a lens frame 62 which retains a second lens group 52 are fitted on an inner circumference side of the straight guide cylinder 43, in order from the subject side. As illustrated in FIG. 4, the retaining frame 61 has at least one cam follower 611 on its outer circumference side, and the lens frame 62 has at least one cam follower 621 on its outer circumference side. The at least one cam follower 611 of the retaining frame 61 fits in one of intersection parts of the cam groove 423 and the three straight grooves 433, and the at least one cam follower 621 of the lens frame 62 fits in one of intersection parts of the cam groove 424 and the three straight grooves 434. Because the intersection parts of the cam groove 423 and the straight grooves 433, and the intersection parts of the cam grooves 424 and the straight grooves 434 move in the optical axis direction by the rotation of the rotation cylinder 42, the retaining frame 61, the lens frame 62, and the first lens group 51 retained by the retaining frame 61 and the second lens group 52 retained by the lens frame 62 move in the optical axis direction, together with the cam followers 611, 621 which fit in these intersection parts.

An outer circumference of the first lens group 51 is retained by a lens frame 71, and the lens frame 71 is retained on an inner circumference side of the retaining frame 61. Moreover, at least one cam member, for example in the present embodiment, three cam members 73 are disposed between the lens frame 71 and the retaining frame 61. A connecting structure of the lens frame 71 and the retaining frame 61 will be explained in detail later.

A shutter/aperture unit 65 is arranged between the first lens group 51 and the second lens group 52, and the shutter/aperture unit 65 is attached to the lens frame 62 which retains the second lens group 52 and moves together with the lens frame 62.

As illustrated in FIG. 2, at a collapse position when the rotation cylinder 42 is rotated to extend each lens group to a photographing position, the screw 421 is guided by the feed screw 412 of the fixed cylinder 41 and the rotation cylinder 42 advances forward in the optical axis direction. The straight guide cylinder 43 advances forward together with the rotation cylinder 42 as well, and due to the at least one key 432 of the straight guide cylinder 43 being fitted in the at least one straight groove 411 of the fixed cylinder 41, the straight guide cylinder 43 goes straight without rotating. By the rotation of the rotation cylinder 42 and the straight advancement of the straight guide cylinder 43, as stated above, the first lens group 51 and the second lens group 52 move in the optical axis direction, and the shutter/aperture unit 65 moves together with the second lens group 52 as well. A movement amount of the first lens group 51 in the direction of the optical axis and a movement amount of the second lens group 52 in the direction of the optical axis relative to a rotation amount of the rotation cylinder 42 depend on shapes of the cam grooves 423, 424.

FIG. 3 illustrates a state in which the first lens group 51 and the second lens group 52 move forward to a photographable position along the optical axis, and in the photographable state, the third lens group 53 is on the optical axis. The third lens group 53 is retained by a lens frame 531 formed in a lever shape, the lens frame 531 is swung between the collapse position and the photographing state, and the third lens group 53 moves between a position outside the optical axis and a position on the optical axis.

Figure 5:
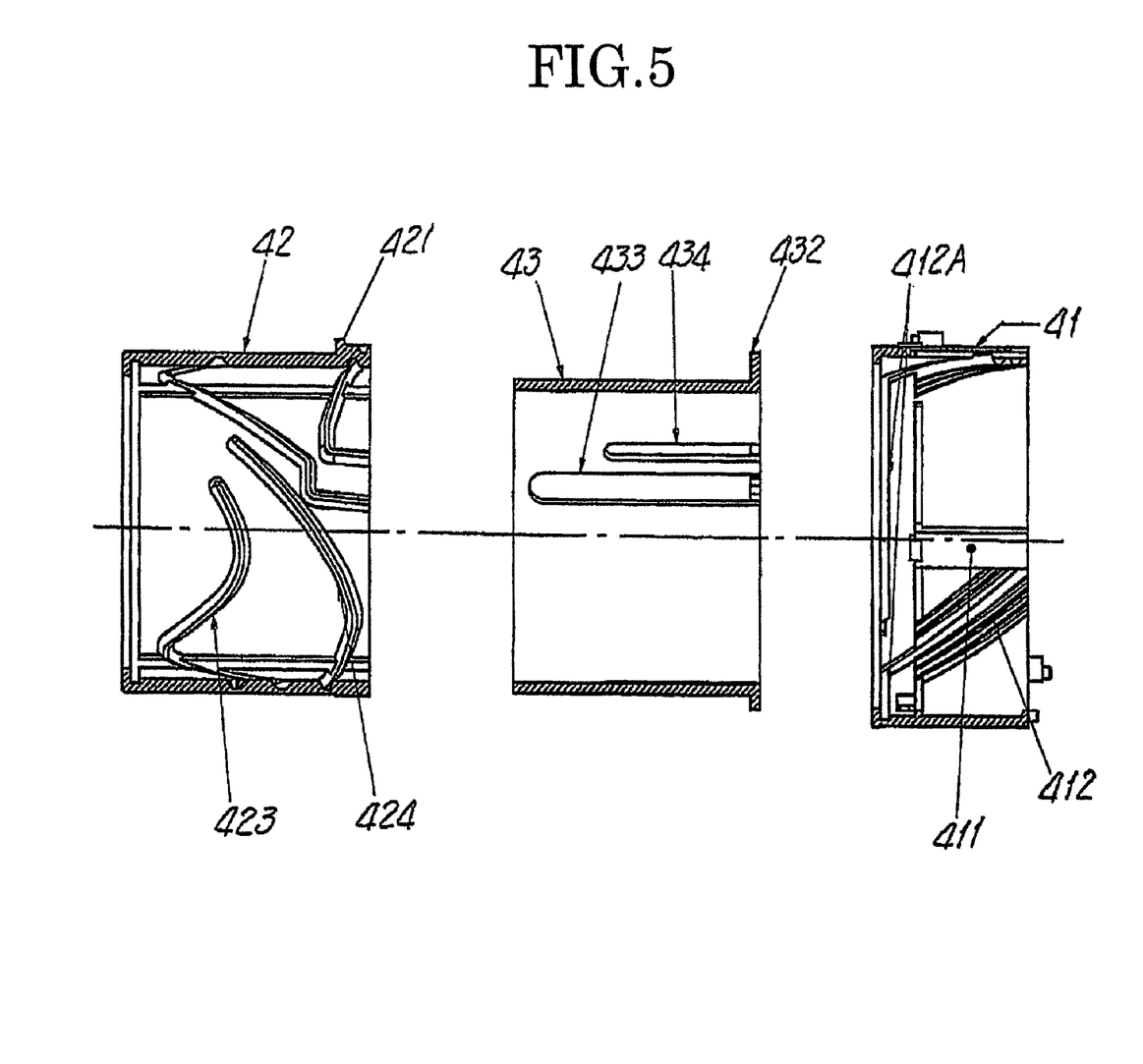
FIG. 5 is an exploded longitudinal sectional view illustrating a fixed frame, a rotation frame and a liner (a straight guide cylinder)
Figure 6:
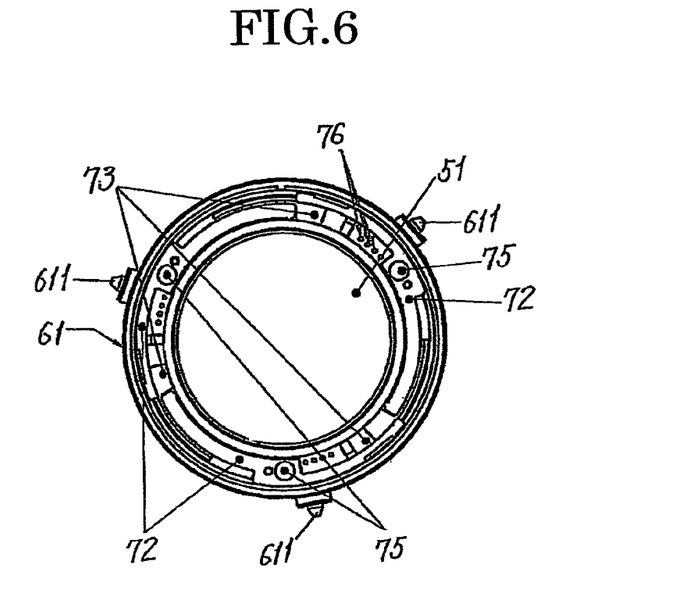
FIG. 6 is a front view illustrating a lens group tilt adjustment mechanism section.
Figure 7:
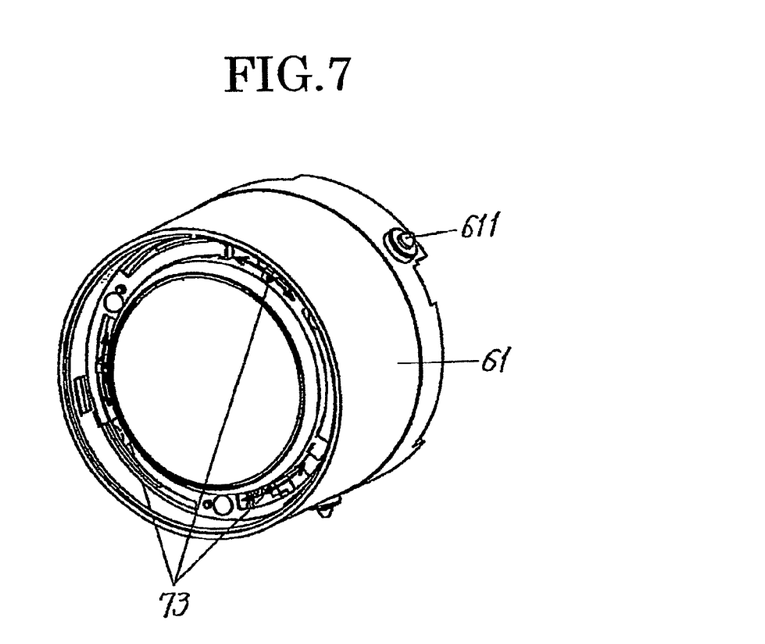
FIG. 7 is a perspective view illustrating a retaining frame including the lens group tilt adjustment mechanism section.

The operating condition illustrated in FIG. 3 is a state in which the rotation cylinder 42 advances along the optical axis to a limit position of the forward movement, and each lens group is extended to a prescribed position, being on a wide angle end and being in the photographable state. The first lens group 51 and the second lens group 52 can be moved relatively until a telephoto end by rotating the rotation cylinder 42 further on the wide angle end. The rotation cylinder 42 can be rotated further though there is the movement limit illustrated in FIG. 3. In other words, as illustrated in FIG. 5, a former end of the feed screw 412 of the fixed cylinder 41 engaged with the screw 421 of the rotation cylinder 42 is connected with a circumferential direction groove 412A extended in a plane perpendicular to the optical axis.

A compression spring 70 is arranged between the retaining frame 61 of the first lens group 51 located nearest the subject side and the second lens group 52 adjacent to the first lens group 51. The spring 70 can include a coil spring. Due to the utilization of the spring 70, both of the first lens group 51 and the second lens group 52 can be retained at an arbitrary stop position stably, and even though a rotation direction of the rotation cylinder 42 is switched, no backlash occurs among the lens groups and a point of focus is steady, and a lens barrel with high resolution can be obtained.

Next, a connecting structure of the lens frame 71 of the first lens group 51 and the retaining frame 61 will be explained. As illustrated in FIGS. 6 to 10, at an inner circumference of a front end of the retaining frame 61, an inward collar 615 is formed integrally with the retaining frame 61. On the other hand, three abutted parts 715 projected outward along the radial direction are formed integrally with the lens frame 71 which retains the outer circumference of the first lens group 51 at its outer circumference, at equal intervals in a circumferential direction of the lens frame 71. The three abutted parts 715 are attached from a front side to the collar 615 of the retaining frame 61 through the three cam members 73 respectively. Each of the abutted parts 715 is pressed against the corresponding cam member 73 by a plate spring 72 as an elastic member which is threadably mounted on the collar 615. In the present embodiment, three plate springs 72 are provided corresponding to the three cam members 73. A side of each of the abutted parts 715 facing the cam member 73 is formed in a spherical shape, and is point-contacted with a cam face of the cam member 73.

Figure 8:
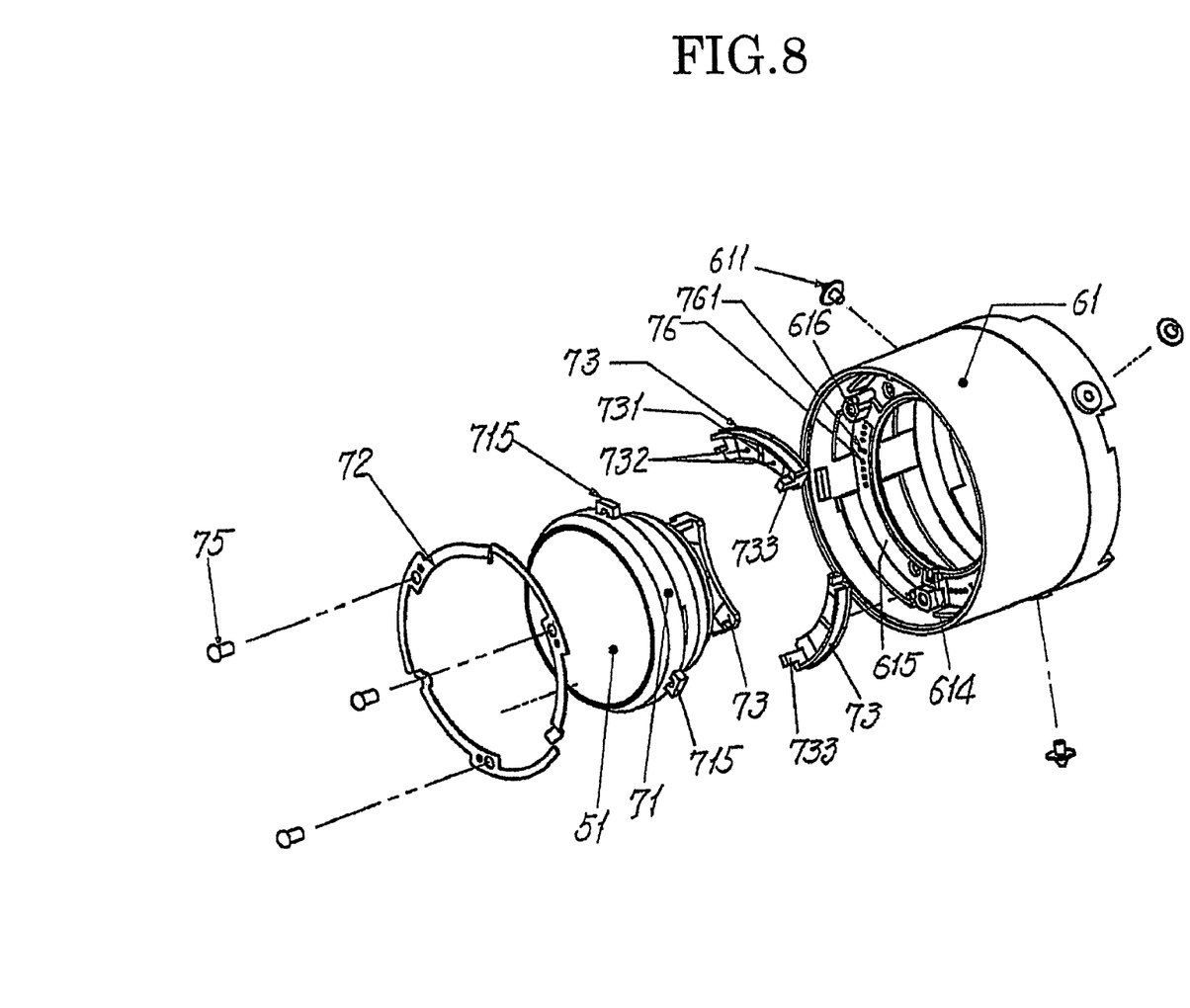
FIG. 8 is an exploded perspective view illustrating a part of a first lens group and the retaining frame including the lens group tilt adjustment mechanism section.
Figure 12:
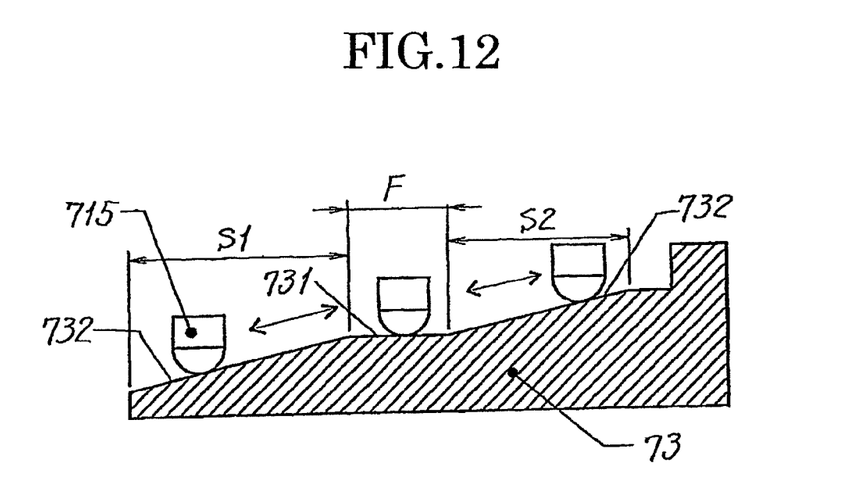
FIG. 12 is a development of a sectional view of at least one cam member.

Each of the cam members 73 is formed in a partial circular arc shape. A side of each of the cam members 73 facing the collar 615 of the retaining frame 61 is a plane perpendicular to the optical axis and contacts the collar 615 of the retaining frame 61, and another side of the each of the cam members 73 has a cam face. Each of the cam members 73 has a projection part 733 projected forward at an end of a length direction along the circular arc, integrally. As illustrated in FIG. 8 and FIG. 12, a reference plane 731 perpendicular to the optical axis direction is formed at a nearly center position of the length direction along the circular arc on the cam face. Two cam planes 732 each of which has a height that changes continuously in the optical axis direction are formed before and after the reference plane 731 in the length direction along the circular arc respectively. Three cam members 73 are arranged at equal intervals in a circumferential direction of the retaining frame 61, and are arranged in a circular arc shape concentric with the optical axis of the lens group.

Each of the plate springs 72 is formed in a partial circular arc shape, and a hole through which a fixed screw 75 penetrates is formed at a nearly center part in a length direction along the circular arc. Each of the plate springs 72 is fixed to the retaining frame 61 by screwing the fixed screw 75 penetrating through the hole into a threaded hole 616 formed at the collar 615 of the retaining frame 61. Since the plate springs 72 suppress the abutted parts 715 of the lens frame 71 from a front side by their elastic power respectively, each of the plate springs 72 acts to press a rear side of its corresponding abutted part 715 against the cam face of its corresponding cam member 73. Thus, the cam member 73, the abutted part 715 of the lens frame 71 and the plate spring 72 are arranged sequentially on the front side of the collar 615 of the retaining frame 61, and a distance from the abutted part 715 of the lens frame 71 to the collar 615 of the retaining frame 61 is decided by the cam face of the cam member 73.

Each of the cam members 73 can be individually moved along a concentric circle arc centered on the optical axis while being suppressed to the collar 615 through its corresponding abutted part 715 by the elastic power of its corresponding plate spring 72, as stated above. Each of the projection parts 733 formed integrally to each of the cam members 73 is useful when the cam members 73 are moved individually to adjust tilt of the first lens group 51, and each of the cam members 73 can be moved by plucking the corresponding projection part 733 with a proper tool.

Figure 11:
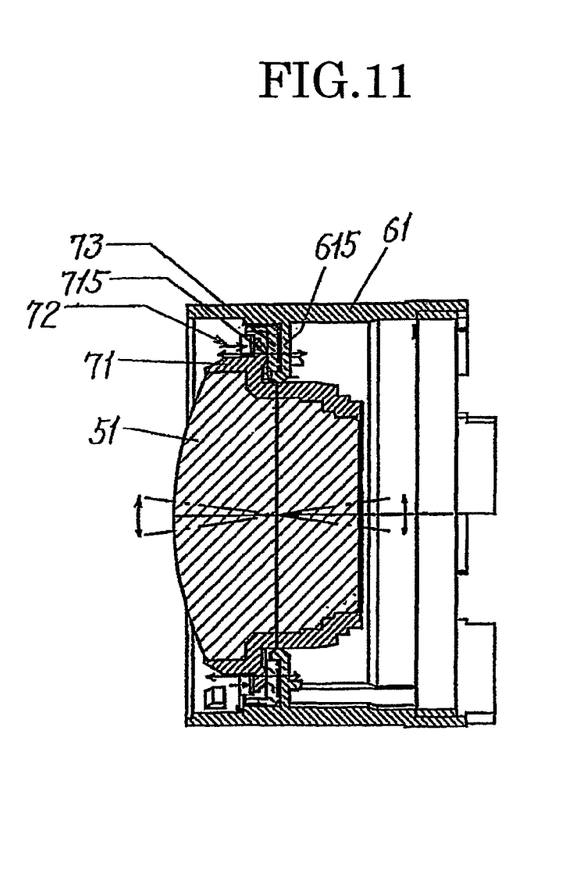
FIG. 11 is a sectional view along line A-A illustrated in FIG. 10.

When assembling the lens barrel, at first, a position of each of the cam members 73 is decided such that each of the abutted parts 715 of the lens frame 71 is abutted on the corresponding flat reference plane 731 located at the center section of the cam member 73. This is set to be a reference position and is illustrated in FIG. 12 as a range represented by a sign F. Since the reference plane 731 of the cam member 73 is a flat plane, it is easy to abut each of the abutted parts 715 to the corresponding reference plane 731 to set the reference position F. When it is necessary to adjust the tilt of the first lens group 51, at least one of the cam members 73 is moved, and an abutting position to the corresponding cam face of the abutted part 715 is moved to the inclined plane 732 from the reference position F. In FIG. 12, a range of the inclined plane lower than the reference plane 731 of the cam face is represented by a sign S1, and a range of the inclined plane higher than the reference plane 731 is represented by a sign S2. Thus, by selecting at least one of the three cam members 73 and moving it individually, a position of the abutted part 715 of the lens frame 71 which is abutting to the cam face of the selected cam member 73 in the optical axis direction is moved, and as illustrated in FIG. 11 with diagonal lines to the optical axis, the tilt of the first lens group 51 relative to the optical axis direction can be adjusted. Since each of the cam members 73 is sandwiched between the corresponding abutted part 715 and the collar 615 by the elastic power of the corresponding plate spring 72, therefore, each of the cam members 73 can be displaced as stated above, and when adjusting and after adjusting, backlash of the lens frame 71 and each of the cam members 73 can be eliminated.

Figure 9:
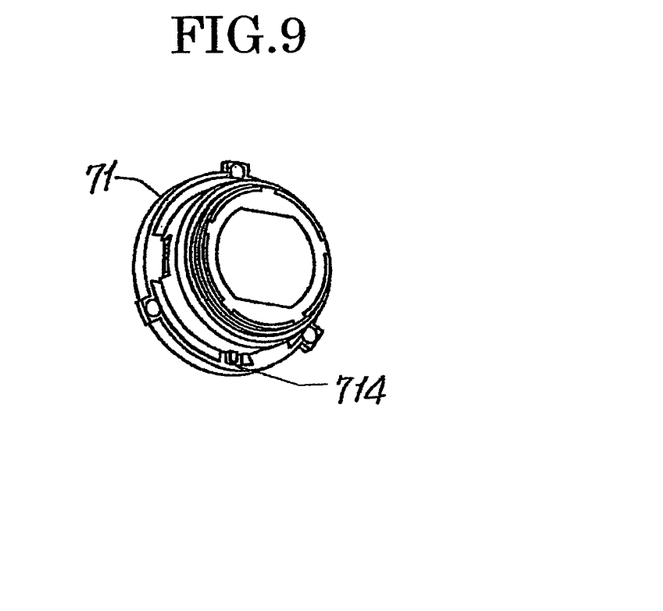
FIG. 9 is a perspective view of the retaining frame of the first lens group, viewed from a rear side.
Figure 10:
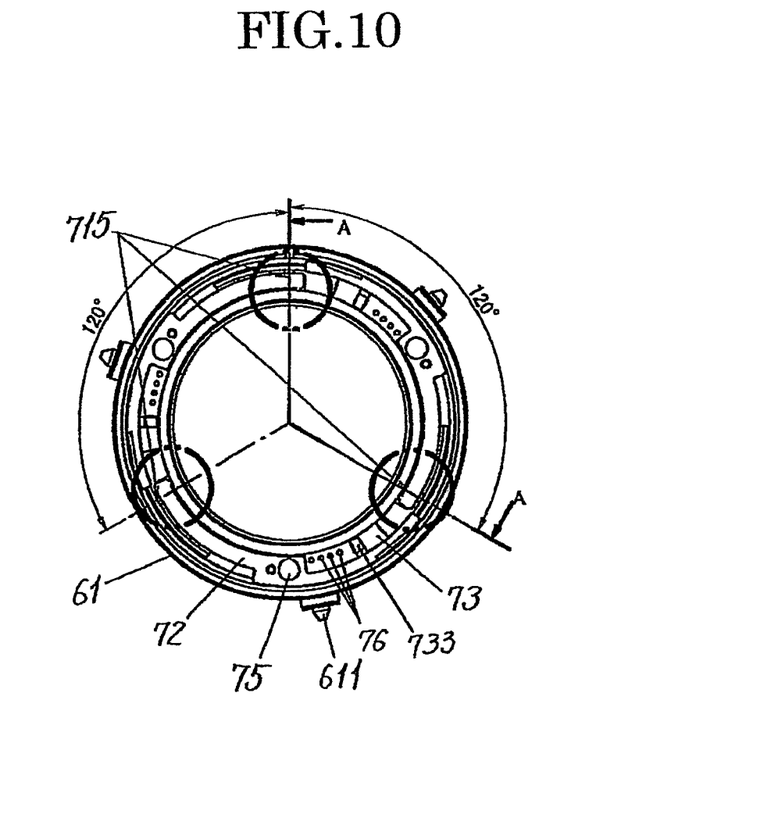
FIG. 10 is a front view illustrating the lens group tilt adjustment mechanism section.

When moving the cam members 73 to adjust the tilt of the lens group, if the lens group rotates around the optical axis along with the movement of the cam members 73, the function of adjusting the tilt of the lens group can not be performed. Then, as illustrated in FIG. 9, a plurality of convex parts 714 are formed integrally at a face of the lens frame 71 which retains the first lens group 51 facing the collar 615 of the retaining frame 61, and a plurality of concave parts 614 engaged with the plurality of the convex parts 714 respectively are formed at the collar 615. These convex parts 714 engage with the concave parts 614 from a front side respectively, and the rotation of the lens frame 71 centered on the optical axis relative to the retaining frame 61 is prevented. Therefore, even though the cam members 73 are moved and the tilt of the lens group 51 is adjusted, the rotation of the lens group 51 relative to the retaining frame 61 is restricted.

The three cam members 73 and the three plate springs 72 are used to adjust the tilt of the lens group. The three cam members 73 are arranged around the lens frame 71 at intervals of 120 degrees evenly in a concentric circle shape concentric with the lens frame 71 of the first lens group 51. The three plate springs 72 are arranged around the lens frame 71 at intervals of 120 degrees evenly in a concentric circle shape concentric with the lens frame 71 of the first lens group 51 as well. Therefore a tilt adjustment mechanism including the cam members 73 can be built into the retaining frame 61 of the first lens group 51 without unnecessarily enlarging an outer diameter of the retaining frame 61. Moreover, the three cam members 73 are arranged at intervals of 120 degrees evenly, therefore the tilt of the lens group can be adjusted in any direction by individually adjusting the movement amount of each of the cam members 73.

As illustrated in FIG. 2, FIG. 3 and FIG. 11, each of the abutted parts 715 abutted with the corresponding cam member 73 of the lens frame 71 of the first lens group 51 is arranged at nearly a center part in the direction of thickness of the first lens group 51, i.e. the optical axis direction. With this structure, the center in the thickness direction of the lens group 51 can be set as a center of the tilt when adjusting the tilt of the lens group 51, and eccentricity and the movement in the optical axis direction of the lens group 51 can be suppressed.

The tilt adjustment of the lens group is carried out in a state such that the imaging device 66 including such as a CCD has not been built into. That is, each of the cam members 73 used for the tilt adjustment is rotated around the optical axis and the tilt of the first lens group 51 to the second lens group 52 is adjusted such that an image surface becomes uniform while observing the imaging status. The imaging device 66 is attached after the tilt adjustment is completed, and tilt of the imaging device 66 is adjusted while observing the imaging status on the imaging device 66, and then fixes it. As a result, tilts of optical axes between the lens groups are adjusted, and high imaging performance can be obtained. Moreover, in the present embodiment, a lens group to be adjusted is the first lens group 51 located nearest the subject side, therefore the position of each of the cam members 73 can be easily adjusted from the front side of the lens barrel.

In addition, in the present embodiment, at least one cam movement amount marking 76 is provided, which is attached to a track where each of the cam members 73 moves at the front surface of the collar 615 of the retaining frame 61 which retains the lens group nearest the subject side i.e. the first lens group 51 and moves it. The at least one marking 76 includes a plurality of marks attached at certain intervals forward and rearward in the circumference direction centered on a mark 761, the mark 761 indicating a position corresponding to an end of the cam member 73 formed with the projection part 733, when the abutted part 715 abuts to the reference plane 731 consisting of the flat plane of the cam member 73. Therefore, each of the cam members 73 used for the tilt adjustment is matched to the corresponding mark 761 indicating a reference position which is a center of the marking 76 when beginning adjustment of the tilt of the lens group, and then is attached, and the adjustment begins from this state. Therefore, the lens group tilt can be adjusted quite easily by estimating a necessary tilt adjustment amount from the imaging status when beginning to adjust, and moving at least one of the cam members 73 corresponding to the estimation while looking at the marking 76 corresponding to the one of the cam members 73.

Figure 1:
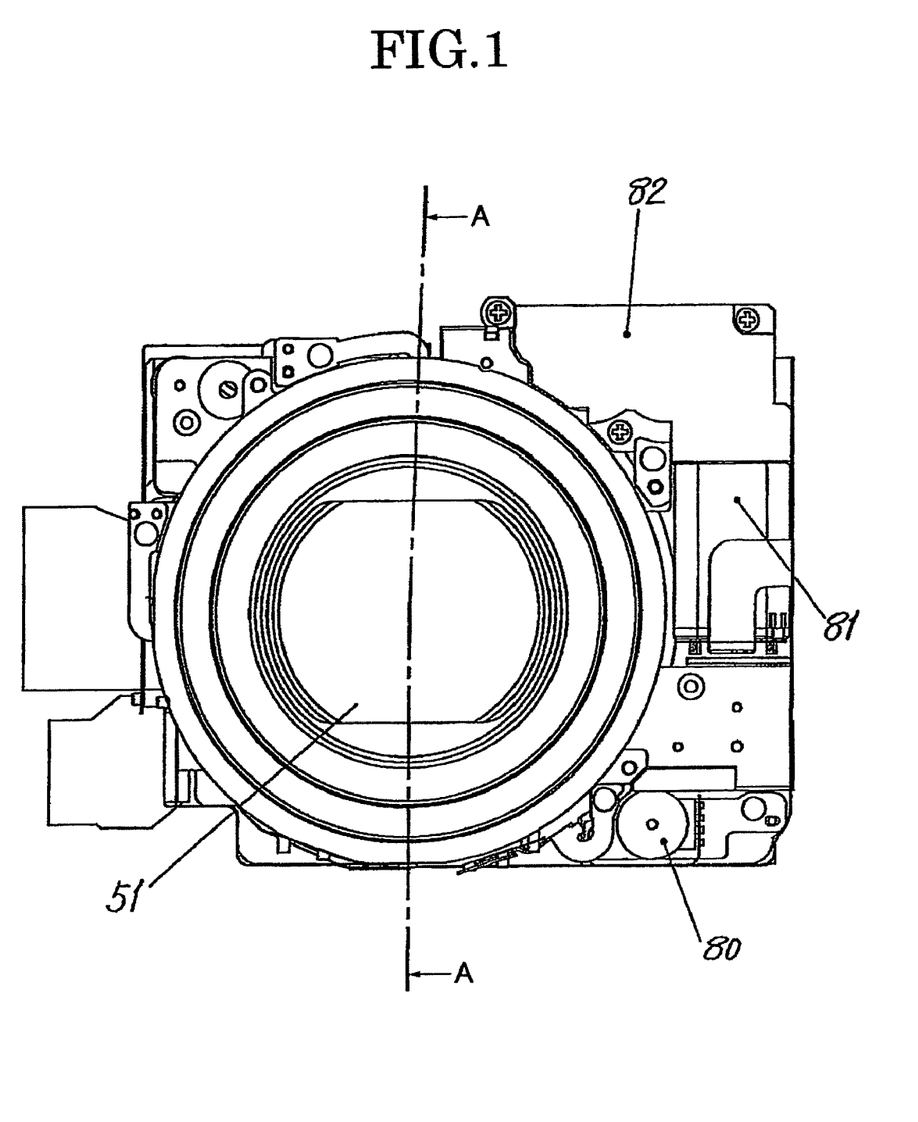
FIG. 1 is a front view illustrating a lens barrel according to an embodiment.

In the present embodiment, the rotation cylinder 42 is driven to rotate by a motorized force. A drive motor 81 which is a driving source of the rotation cylinder 42, and a power transmission part 82 including such as a gear train which transmits a torque of the motor 81 to the rotation cylinder 42 are illustrated in FIG. 1. The drive motor 81 works to drive within a range from the collapse position to the wide angle end, and within a range from the wide angle end to the telephoto end, separately, and by operating a zoom operation button, the drive motor 81 operates in the range from the wide angle end to the telephoto end. In addition, an automatic focusing device is provided, in which a focusing drive motor 80 rotation controlled by a control signal from a focus detection part is built, and for example, the third lens group 53 is driven in the optical axis direction by the motor 80 and a focusing is carried out.

Preferred embodiments have been explained in relation to the drawings. It is to be understood that other possible modifications and variations may be made without departing from the spirit and scope of the invention. Therefore, the appended claims encompass all such changes and modifications as falling within the true spirit and scope of the invention.

The present invention can be applied to a lens barrel in which a zoom mechanism is not installed, although in the above-mentioned embodiment an example of the lens barrel including the zoom mechanism is explained.

It is possible to apply the lens barrel to a digital camera and other various cameras as an imaging lens. Therefore, the tilt of the optical axis of each lens group can be adjusted with a high accuracy, and an imaging device such as a camera with high imaging performance can be provided. In addition, it is possible to apply the lens barrel to a camera-equipped mobile phone and PDA and other information terminal devices as an imaging lens. Therefore, the tilt of the optical axis of each lens group can be adjusted with a high accuracy, and an information terminal device with high imaging performance can be provided.

The invention claimed is:

1. A lens barrel, comprising:
lens groups which constitute an imaging optical system;
a lens frame which retains at least one of the lens groups;
a retaining frame which retains the lens frame; and
cam members, each of which includes a cam face, the cam members being arranged between the lens frame and the retaining frame, and each of the cam members being formed in a partial circular arc shape, and
wherein each of the cam members is capable of moving separately,
wherein the cam face provided on each of the cam members includes a reference plane which is perpendicular to an optical axis direction and formed at a nearly center position of a length direction along the circular arc on the cam face, and the cam face has a height that changes continuously in the optical axis direction, and is formed before and after the reference plane,
wherein the lens frame includes abutted parts which abut on the cam faces of the cam members,
wherein the cam members are arranged in a circular arc shape concentric with the lens frame, and
wherein the height of the cam faces on which the abutted parts of the lens frame abut is changed by moving at least one of the cam members centered on a center axis of the lens frame on a plane perpendicular to an imaging optical axis of the lens barrel, and tilt of the lens frame relative to the retaining frame is changed.

2. A lens barrel according to claim 1, wherein in an imaging optical axis direction of the lens barrel, a side of each cam member includes a plane perpendicular to an optical axis and contacting the retaining frame, wherein the cam faces of the cam members are formed in a circular arc shape and are arranged on a concentric circle with the lens frame.

3. A lens barrel according to claim 1, wherein an elastic member which presses abutted parts against the corresponding cam faces is fixed to the retaining frame.

4. A lens barrel according to claim 3, wherein the elastic member includes a plate spring.

5. A lens barrel according to claim 1, wherein the cam members include three cam members, and the abutted parts are formed on corresponding positions of the three cam members.

6. A lens barrel according to claim 1, wherein the abutted parts are arranged at equal intervals around an imaging optical axis of the lens barrel, and the cam members are arranged at equal intervals around the imaging optical axis of the lens barrel.

7. A lens barrel according to claim 1, wherein a position of the abutted parts in an optical axis direction of the lens frame is near a center position of the at least one lens group retained by the lens frame, in its thickness direction in an optical axis direction of the lens groups.

8. A lens barrel according to claim 1, wherein the lens frame and the retaining frame have an engaged part which restricts the rotation of the lens frame relative to the retaining frame by engagement in an imaging optical axis direction of the lens groups.

9. A lens barrel according to claim 1, wherein the cam faces of the cam members have a vertical plane perpendicular to an optical axis direction located at a nearly center part of an abutting range of the abutted parts of the lens frame, and a tilted plane formed on both sides of the vertical plane, each of which has a height changed in the optical axis direction.

10. A lens barrel according to claim 1, wherein at least one marking is provided at the lens frame which is configured to indicate a movement amount of the cam members.

11. A lens barrel according to claim 1, wherein the lens frame retains the lens group nearest a subject side, and the cam faces of the plurality of cam members are formed on a face of the plurality of cam members on the subject side in an imaging optical axis direction of the lens barrel.

12. A lens barrel according to claim 11, wherein tilt of the lens group nearest the subject side is aligned relative to optical axes of other lens groups.

13. A lens barrel according to claim 1, wherein the lens barrel further comprises an imaging device arranged at an imaging position of the imaging optical system, and tilt of the imaging device is capable of being adjusted.

14. An imaging device, comprising an imaging lens which includes a lens barrel according to claim 1.

15. An information terminal device, having a camera function by an imaging device, and comprising a lens barrel according to claim 1, an imaging surface of the imaging device being adjusted perpendicular to an optical axis of the imaging lens.

* * * * *